United States Patent [19]
Inata

[11] Patent Number: 5,910,953
[45] Date of Patent: Jun. 8, 1999

[54] ATM INTERFACE APPARATUS FOR TIME-DIVISION MULTIPLEX HIGHWAYS

[75] Inventor: Hisashi Inata, Tokyo, Japan

[73] Assignee: NEC Corporation, Tokyo, Japan

[21] Appl. No.: 08/731,275

[22] Filed: Oct. 11, 1996

[30] Foreign Application Priority Data

Oct. 13, 1995 [JP] Japan ................................. 7-265338

[51] Int. Cl.$^6$ ..................................................... H04J 3/00
[52] U.S. Cl. ........................................ 370/395; 370/508
[58] Field of Search ........................... 370/355, 375,
370/376, 377, 378, 379, 389, 395, 396,
398, 428, 468, 474, 412, 503, 506, 507,
508, 509, 510, 512

[56] References Cited

U.S. PATENT DOCUMENTS

| | | | |
|---|---|---|---|
| 5,390,184 | 2/1995 | Morris | 370/353 |
| 5,412,655 | 5/1995 | Yamada et al. | 370/474 |
| 5,483,521 | 1/1996 | Aramaki | 370/396 |
| 5,535,201 | 7/1996 | Zheng | 370/231 |
| 5,577,038 | 11/1996 | Miyahara | 370/352 |
| 5,696,764 | 12/1997 | Soumiya et al. | 370/395 |

*Primary Examiner*—Chi H. Pham
*Assistant Examiner*—Kwang B. Yao
*Attorney, Agent, or Firm*—Foley & Lardner

[57] ABSTRACT

An ATM interface apparatus for time-division multiplex highways includes registers, a counter, FIFO memories, coincidence detection circuits, and flip-flop circuits. The registers hold allocation information of time slots used to transmit cells in asynchronous transfer mode (ATM) communication through time-division multiplex highways. The counter detects the timings and numbers of respective time slots of the time-division multiplex highways. The FIFO memories store cells transmitted through ATM communication lines and exchange the cells between the ATM communication lines and the time-division multiplex highways. The coincidence detection circuits determine, on the basis of the detected time slot numbers and the allocation information, whether time slots are used for the transmission of cells. When determination results obtained by the coincidence detection circuits indicate that the time slots are used for transmission of the cells, the flip-flop circuits control transfer of the cells between the ATM communication lines and the time-division multiplex highways by designating cell read/write access to the FIFO memories.

6 Claims, 10 Drawing Sheets

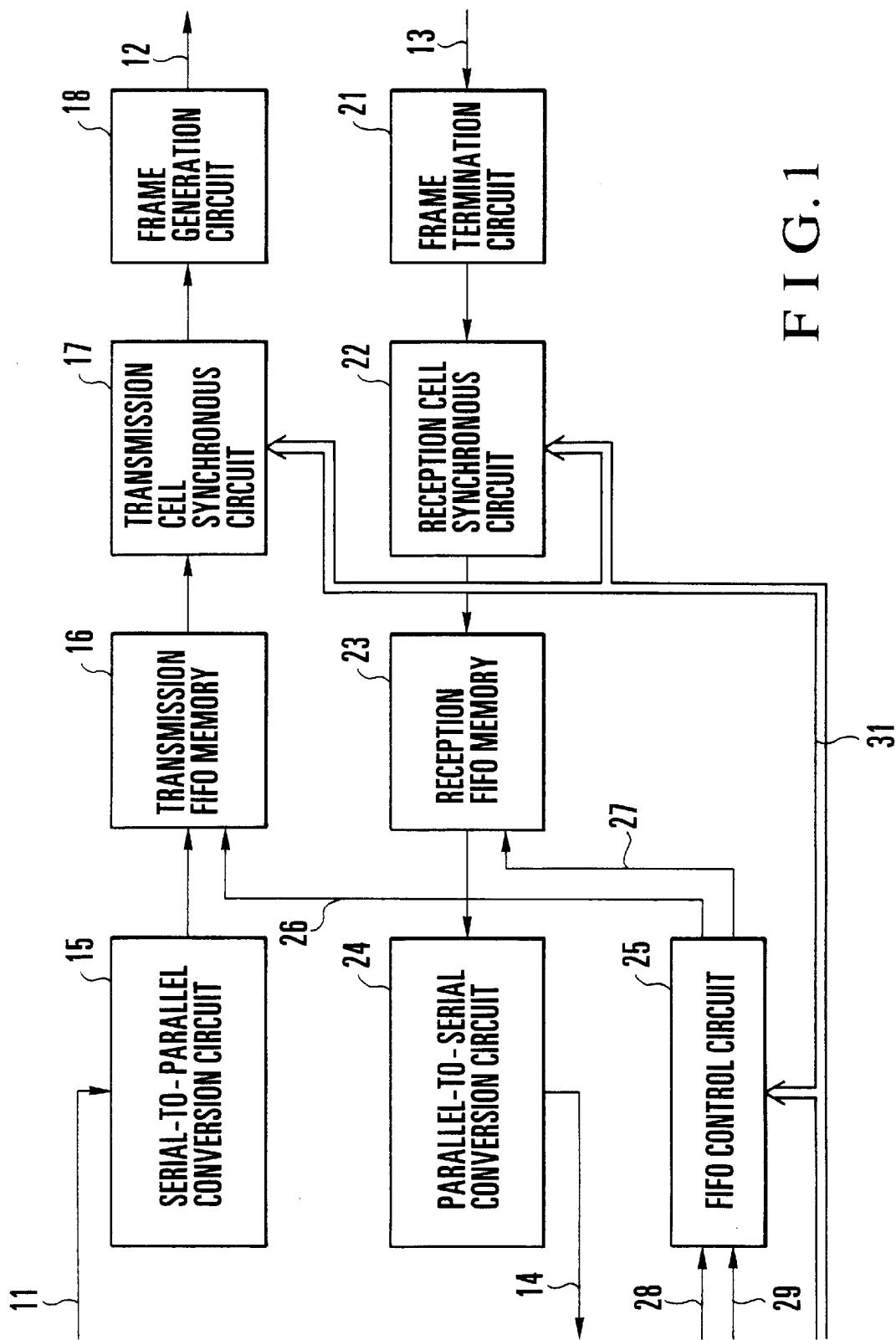
F I G. 1

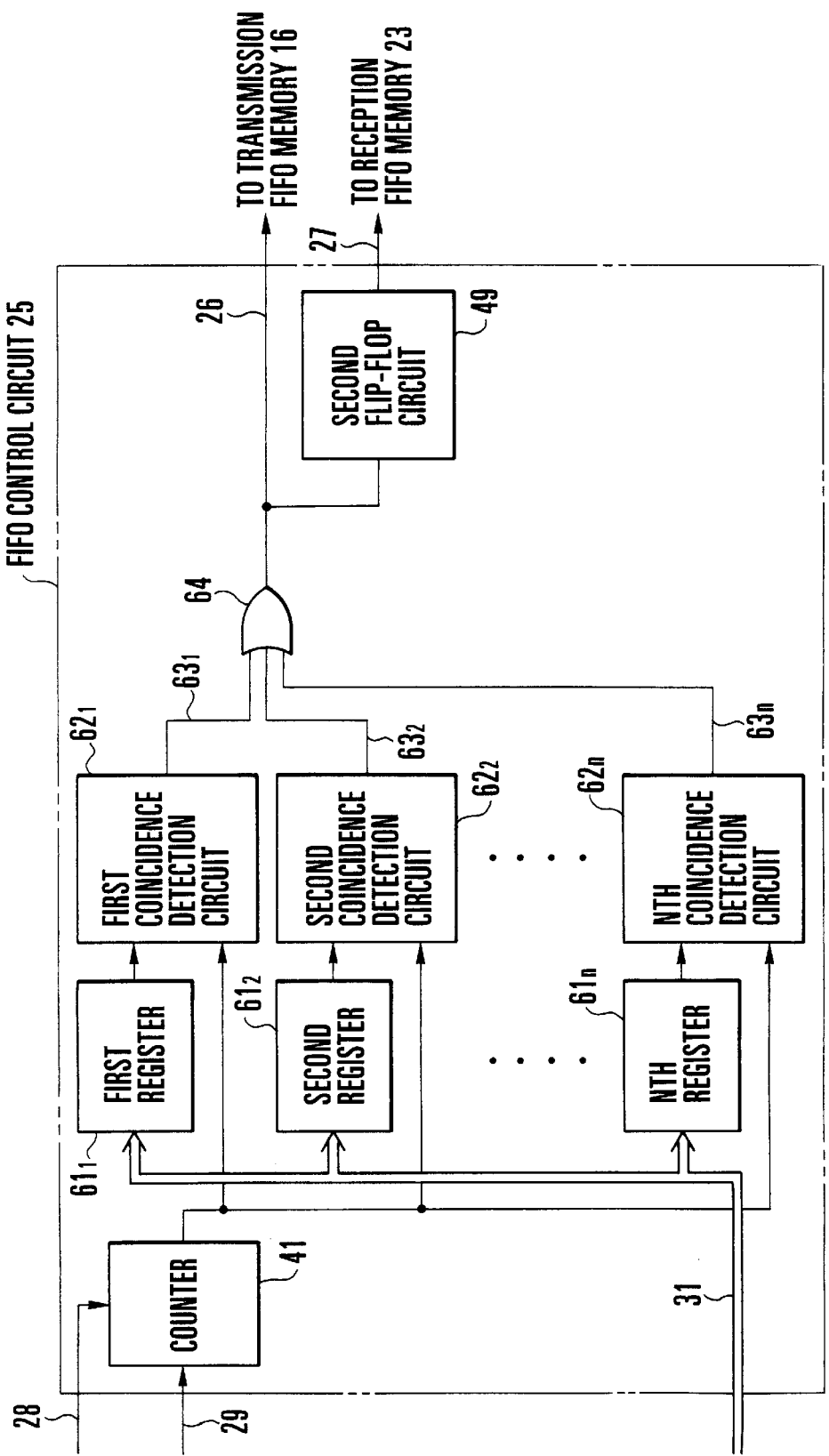
F I G. 6

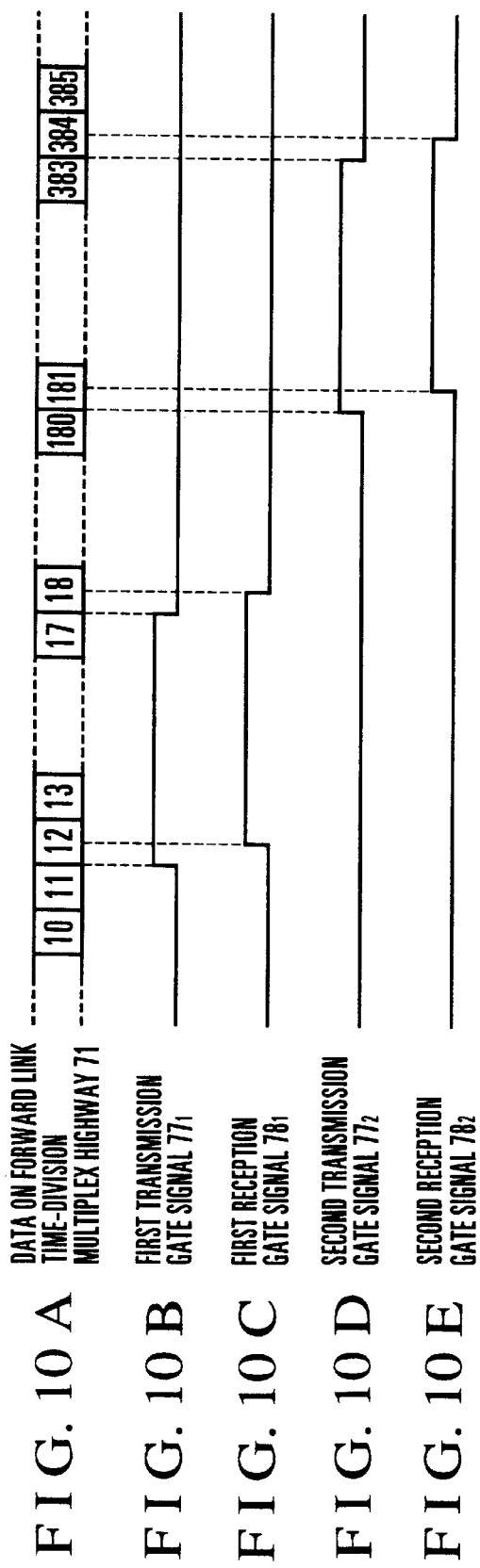

ID_910,953

ATM INTERFACE APPARATUS FOR TIME-DIVISION MULTIPLEX HIGHWAYS

BACKGROUND OF THE INVENTION

The present invention relates to an ATM interface apparatus for time-division multiplex highways which is used to connect communication lines in the asynchronous transfer mode (ATM) to existing time-division multiplex highways and, more particularly, to an ATM interface apparatus for time-division multiplex highways which is designed to improve the line utilization efficiency of time-division multiplex highways.

In performing communication in the asynchronous transfer mode, information is transmitted in units of relatively small packets called cells. In ATM communication, the band can be arbitrarily changed, even during communication, from a band for low-speed communication or communication of a small amount of information to a high-speed, broad band. In performing high-speed, broad-band communication, many cells are transmitted. In performing low-speed communication, the cell transmission cycle is prolonged to transmit a small number of cells. In this manner, in ATM communication, the traffic in a communication line changes.

When such a line for ATM communication is to be connected to a conventional time-division multiplex highway, time slots which can cope with the maximum traffic of the ATM line are allocated in a fixed manner.

An ATM interface apparatus is disclosed in Japanese Patent Laid-Open No. 4-68730. In this apparatus, band compression is performed in accordance with the kind of information to be transmitted through cells, and time slots used for a time-division multiplex line in accordance with a band required after compression are allocated. For example, different band compression schemes are used depending on whether the kind of information is "speech" or "digital data".

Japanese Patent Laid-Open No. 2-29196 discloses a technique of allocating a required number of time slots when a call is generated. In this conventional technique, a list of the slot numbers of time slots in an idle state which are linked with pointers is prepared. When a call is generated, a required number of time slots are allocated from the head of the list. When the allocation is canceled, the corresponding time slot number is connected to the end of the list.

When time slots of a time-division multiplex highway are allocated in a fixed manner to transmit cells through an ATM communication line, a maximum number of time slots which can cope with the maximum traffic must be allocated. For this reason, when the traffic of the ATM line is small, the number of time slots which are not used for transmission of cells increases, resulting in a deterioration in the line utilization efficiency of the time-division multiplex highway.

In addition, as disclosed in Japanese Patent Laid-Open No. 4-68730, if band compression is performed in accordance with the kind of information of a cell, the number of time slots can be decreased. If, however, a maximum necessary number of time slots after compression are to be allocated, some time slots are not used either in a small-traffic state. Furthermore, a circuit for performing band compression in accordance is with a kind of information is required. As a result, the arrangement of the ATM interface apparatus is complicated.

According to Japanese Patent Laid-Open No. 2-29196, when a call is generated, time slots required for transmission of cells are allocated. The time-division multiplex highway lines can therefore be efficiently used. However, since a list of time slots in an idle state must be managed, the arrangement of the ATM interface apparatus is complicated.

SUMMARY OF THE INVENTION

It is an object of the present invention to provide an ATM interface apparatus for time-division multiplex highways which can efficiently transmit ATM cells through the time-division multiplex highways.

In order to achieve the above object, according to the present invention, there is provided an ATM interface apparatus for a time-division multiplex highway, comprising holding means for holding allocation information of a time slot used to transmit a cell as a transmission unit in asynchronous transfer mode (ATM) communication through a time-division multiplex highway, detection means for detecting a timing and number of each time slot of the time-division multiplex highway, a cell buffer for storing cells transmitted through an ATM communication line and exchanging the cells between the ATM communication line and the time-division multiplex highway, determination means for determining, on the basis of the time slot number detected by the detection means and the allocation information held in the holding means, whether a time slot is used for transmission of a cell, and control means for, when a determination result obtained by the determination means indicates that the time slot is used for transmission of the cell, controlling transfer of the cell between the ATM communication line and the time-division multiplex highway by designating cell read/write access to the cell buffer.

BRIEF DESCRIPTION OF THE DRAWINGS

FIG. 1 is a block diagram showing an ATM interface apparatus for time-division multiplex highways according to the first embodiment of the present invention;

FIG. 6 is a block diagram showing a FIFO control circuit in an ATM interface apparatus for time-division multiplex highways according to the second embodiment of the present invention;

FIGS. 10A to 10E are timing charts showing the waveforms of signals in the respective portions of the ATM interface apparatus in FIG. 8.

DESCRIPTION OF THE PREFERRED EMBODIMENTS

Figure 2:
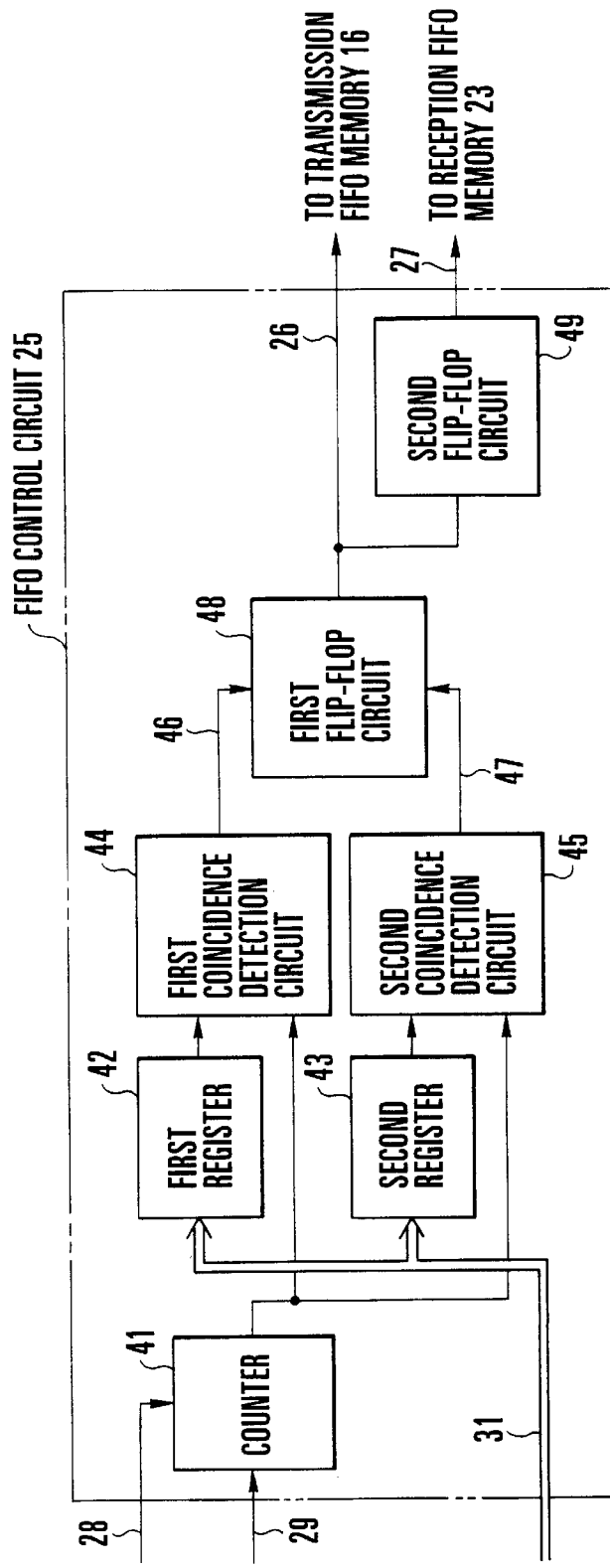
FIG. 2 is a block diagram showing a FIFO control circuit in FIG. 1.

FIG. 1 shows an ATM interface apparatus for time-division multiplex highways according to the first embodiment of the present invention. This apparatus has a function of extracting data transmitted in an arbitrary number of predetermined time slots of a forward link time-division multiplex highway 11, format-converting the data into cells, and sequentially sending the cells to a forward link ATM line 12. The apparatus also has a function of extracting cells received through a reverse link ATM line 13, and sending the cells to a reverse link time-division multiplex highway 14 by using time slots of the same slot numbers as those of the forward link time-division multiplex highway 11. An ATM interface apparatus for time-division multiplex highways will be referred to as an ATM interface apparatus.

Each of the reverse and forward link time-division multiplex highways 14 and 11 has a band of 2 Mbps, and is designed to transmit data in a serial form. Data received through the forward link time-division multiplex highway 11 is input to a serial-to-parallel conversion circuit 15. The serial-to-parallel conversion circuit 15 converts serial data into parallel data consisting a predetermined number of bits. An output from the serial-to-parallel conversion circuit 15 is input to a transmission FIFO (First-In First-Out) memory 16 for storing data to be sent to the forward link ATM line 12. The transmission FIFO memory 16 is a first-in first-out buffer memory. Data read out from the transmission FIFO memory 16 is input to a transmission cell synchronous circuit 17.

The transmission cell synchronous circuit 17 performs cell synchronization by providing a timing at which a cell is to be sent to the forward link ATM line 12, and converts a virtual path identifier (VPI) and a virtual channel identifier (VCI) added to the header portion of the cell in accordance with a destination. Data output from the transmission cell synchronous circuit 17 is input to a frame generation circuit 18. The frame generation circuit 18 converts the data from the transmission cell synchronous circuit 17 into a frame format on an ATM transmission path, and sends it to the forward link ATM line 12.

The reverse link ATM line 13 is connected to a frame termination circuit 21. The frame termination circuit 21 terminates the ATM transmission path to extract cells, and outputs the cells to a reception cell synchronous circuit 22. The reception cell synchronous circuit 22 performs cell synchronization and performs conversion processing of the VPIs and the VCIs. Cells output from the reception cell synchronous circuit 22 are sequentially input to and stored in a reception FIFO memory 23 serving as a reception buffer. An output from the reception FIFO memory 23 is input to a parallel-to-serial conversion circuit 24. The parallel-to-serial conversion circuit 24 converts parallel data read out from the reception FIFO memory 23 into serial data, and sends the serial data to the reverse link time-division multiplex highway 14.

A FIFO control circuit 25 controls the write timing for the transmission FIFO memory 16 and the read timing for the reception FIFO memory 23. The FIFO control circuit 25 outputs a transmission gate signal 26 indicating the timing at which data received through the forward link time-division multiplex highway 11 is to be written in the transmission FIFO memory 16. The FIFO control circuit 25 also outputs a reception gate signal 27 indicating the timing at which a cell is to be read out from the reception FIFO memory 23.

A frame sync signal 28 for identifying the head position of a frame and a clock signal 29 are input from the time-division multiplex highway side to the FIFO control circuit 25. An input/output bus 31 is connected to the FIFO control circuit 25 to receive the slot numbers of some of the time slots of the time-division multiplex highways 11 and 14, which are set to be used for the transmission of ATM cells from a control unit (not shown), together with various control information. The input/output bus 31 is also connected to the transmission cell synchronous circuit 17 and the reception cell synchronous circuit 22.

FIG. 2 shows the schematic arrangement of the FIFO control circuit 25 in FIG. 1. This circuit includes a counter 41 for counting the time slot numbers of the time-division multiplex highways 11 and 14, and first and second registers 42 and 43 for storing the slot numbers of time slots, of a plurality of consecutive time slots to be used to transmit cells, which correspond to the start and end positions. A first coincidence detection circuit 44 detects coincidence between count values output from the counter 41, i.e., the slot numbers of time slots on the time-division multiplex highways 11 and 14, and the time slot number corresponding to the start position and stored in the first register 42. A second coincidence detection circuit 45 detects coincidence between count values output from the counter 41 and the time slot number corresponding to the end position and stored in the second register 43. Upon detecting coincidence, the first and second coincidence detection circuits 44 and 45 respectively output coincidence signals 46 and 47.

The coincidence signal 46 output from the first coincidence detection circuit 44 is input as a set signal to a first flip-flop circuit 48. The coincidence signal 47 output from the second coincidence detection circuit 45 is input as a reset signal to the first flip-flop circuit 48. An output from the first flip-flop circuit 48 is input as the transmission gate signal 26 to the transmission FIFO memory 16 in FIG. 1. The transmission gate signal 26 serves to control the writing timing for the transmission FIFO memory 16. The output from the first flip-flop circuit 48 is also input to a second flip-flop circuit 49. The second flip-flop circuit 49 outputs a signal obtained by delaying the output from the first flip-flop circuit 48 by a period of time corresponding to ½ one time slot. The output signal from the second flip-flop circuit 49 is input as the reception gate signal 27 to the reception FIFO memory 23 in FIG. 1.

Figure 3:
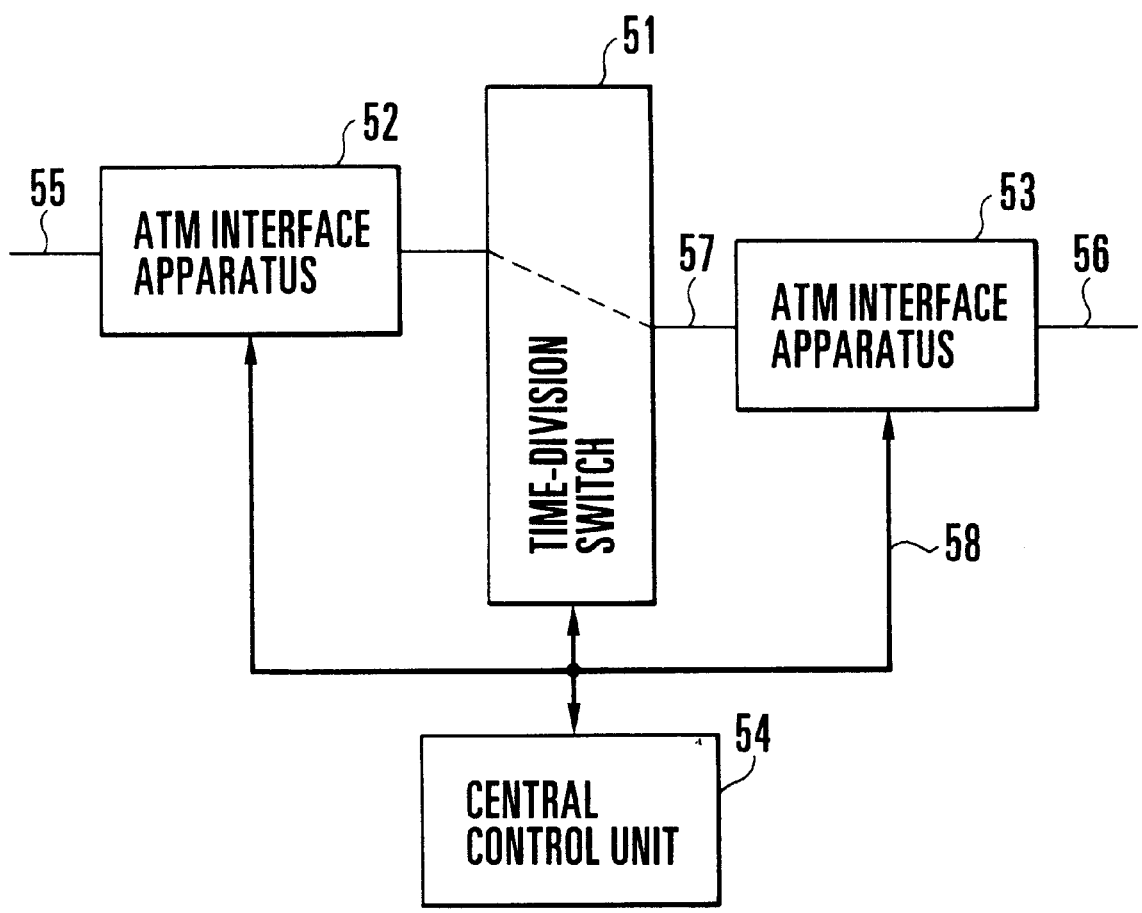
FIG. 3 is a block diagram showing the schematic arrangement of a time-division switching system to which the ATM interface apparatus in FIG. 1 is connected.

FIG. 3 shows the schematic arrangement of a time-division switching system to which ATM interface apparatuses, each identical to the one shown in FIG. 1, are connected. The time-division switching system is constituted by a time-division switch 51, ATM interface apparatuses 52 and 53, and a central control unit 54 for controlling the overall switching system. The ATM interface apparatuses 52 and 53 are respectively connected to terminal units (not shown) through ATM lines 55 and 56. Various data are transmitted between the ATM interface apparatuses 52 and 53 through a time-division multiplex highway 57. The time-division switch 51 and the ATM interface apparatuses 52 and 53 exchange control signals 58 with the central control unit 54. In this case, the ATM interface apparatuses 52 and 53 are connected to the two ends of the time-division switch 51. If, however, the ATM interface apparatuses 52 and 53 are connected to the two ends of a communication network constituted by the time-division multiplex highway 57, the communication network constituted by the time-division multiplex highway 57 can be connected to the ATM lines 55 and 56.

The central control unit 54 sets the slot numbers of time slots to be used for the transmission of cells through the time-division multiplex highways 11 and 14 in the ATM interface apparatuses 52 and 53 and the time-division switch 51 in accordance with an instruction from a maintenance terminal (not shown). In addition, the central control unit 54 sets the slot numbers of time slots designated in advance in correspondence with predetermined times in the ATM interface apparatuses 52 and 53 and the time-division switch 51. If, for example, the traffic of cells changes regularly to a certain degree in accordance with the days of a week or time zones, required numbers of time slot numbers are registered in the central control unit 54 in advance in correspondence with the days of a week or the time zones. The central control unit 54 notifies the ATM interface apparatuses 52 and 53 and the time-division switch 51 of the slot numbers of time slots to be used for the transmission of cells at set times in accordance with the registered data. With this operation, the numbers of time slots corresponding to the traffics in the days of a week or the respective time zones are allocated, thus allowing efficient use of the time-division multiplex highways 11 and 14.

The operation of the above ATM interface apparatus will be described next.

FIGS. 4A to 4G show the states of signals in the respective portions of the ATM interface apparatus in FIG. 1. Assume that information in a standby state, of information in the time-division multiplex highways 11 and 14 each having a band of 2 Mbps, is transmitted through the time-division switch 51 at a maximum rate of 768 kbps. One frame in each of the time-division multiplex highways 11 and 14 is constituted by 32 time slots. "0" to "31" are assigned to the respective time slots. The respective time slots correspond to the channels of each of the time-division multiplex highways 11 and 14.

The timing of data in the forward link time-division multiplex highway 11 (FIG. 4A) is shifted from that of data in the reverse link time-division multiplex highway 14 (FIG. 4B) by a period ½ one time slot. The frame sync signal 28 (FIG. 4C) indicating the start position of a frame as a control signal is supplied from the time-division multiplex highway side, together with the clock signal 29 (FIG. 4D) having a period equal to each time slot interval. The frame sync signal 28 and the clock signal 29 correspond to the forward link time-division multiplex highway 11.

The frame sync signal 28 is input as a reset signal to the counter 41 of the FIFO control circuit 25 in FIG. 2 to initialize its count value. The clock signal 29 is input as a clock signal to the counter 41 to increment its count value. With this operation, the count value (FIG. 4E) of the counter 41 indicates a value coinciding with a time slot number of the forward link time-division multiplex highway 11.

Assume that ATM cells are transmitted by using six consecutive time slots, from the second channel to the seventh channel of the 32 channels of the time-division multiplex highway having a band of 2 Mbps. In this case, for example, the central control unit 54 in FIG. 3 sets "2", as a start time slot number as a time slot number indicating the start position of a channel for transmitting cells, in the first register 42 of the FIFO control circuit 25 shown in FIG. 2. In addition, "8" is set, as an end time slot number as a time slot number indicating the end position of the channel for transmitting cells, in the second register 43. In this case, the end time slot number indicating the end position is larger than the slot number of a time slot at the termination which is used to transmit a cell by "1". This is because the values of the gate signals 26 and 27 to the transmission and reception FIFO memories 16 and 23 change immediately after the count value of the counter 41 changes.

When the count value of the counter 41 changes to the value stored in the first register 42, i.e., "2", the first coincidence detection circuit 44 outputs the coincidence signal 46 to set the first flip-flop circuit 48. When the count value of the counter 41 changes to the value stored in the second register 43, i.e., "8", the second coincidence detection circuit 45 outputs the coincidence signal 47 to reset the first flip-flop circuit 48. With this operation, the transmission gate signal 26 (FIG. 4F) output from the first flip-flop circuit 48 is kept at "H" level in the interval between the start time of the second time slot of the forward link time-division multiplex highway 11 and the end time of the seventh time slot. The output from the second flip-flop circuit 49 is delayed with respect to the output from the first flip-flop circuit 48 by a time period ½ one time slot. For this reason, the reception gate signal 27 (step 4G) is kept at "H" state in the interval between the start time of the second time slot of the reverse link time-division multiplex highway 14 and the end time of the seventh time slot.

Figure 4:
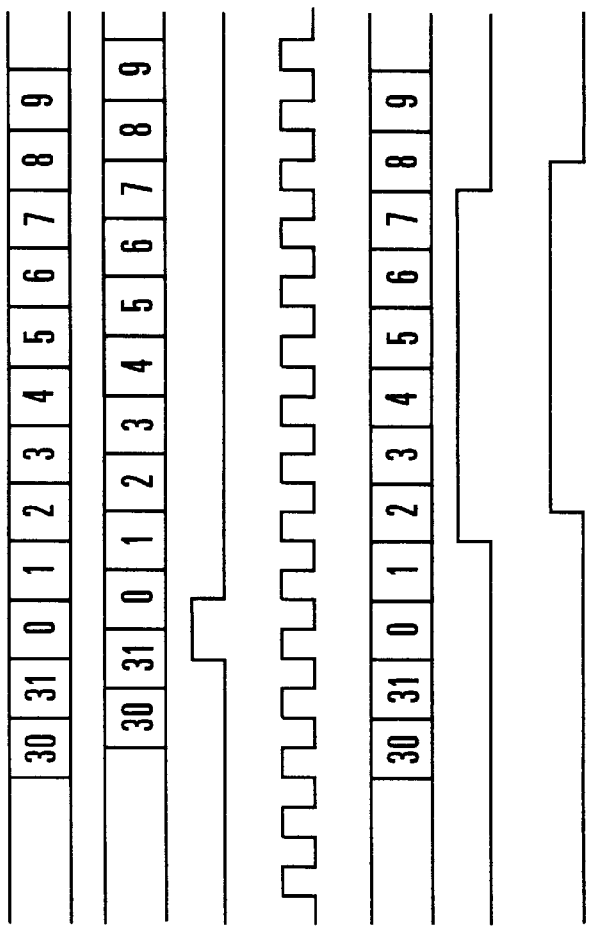
FIGS. 4A to 4G are timing charts showing the waveforms of signals in the respective portions of the ATM interface apparatus in FIG. 1.
Figure 5:
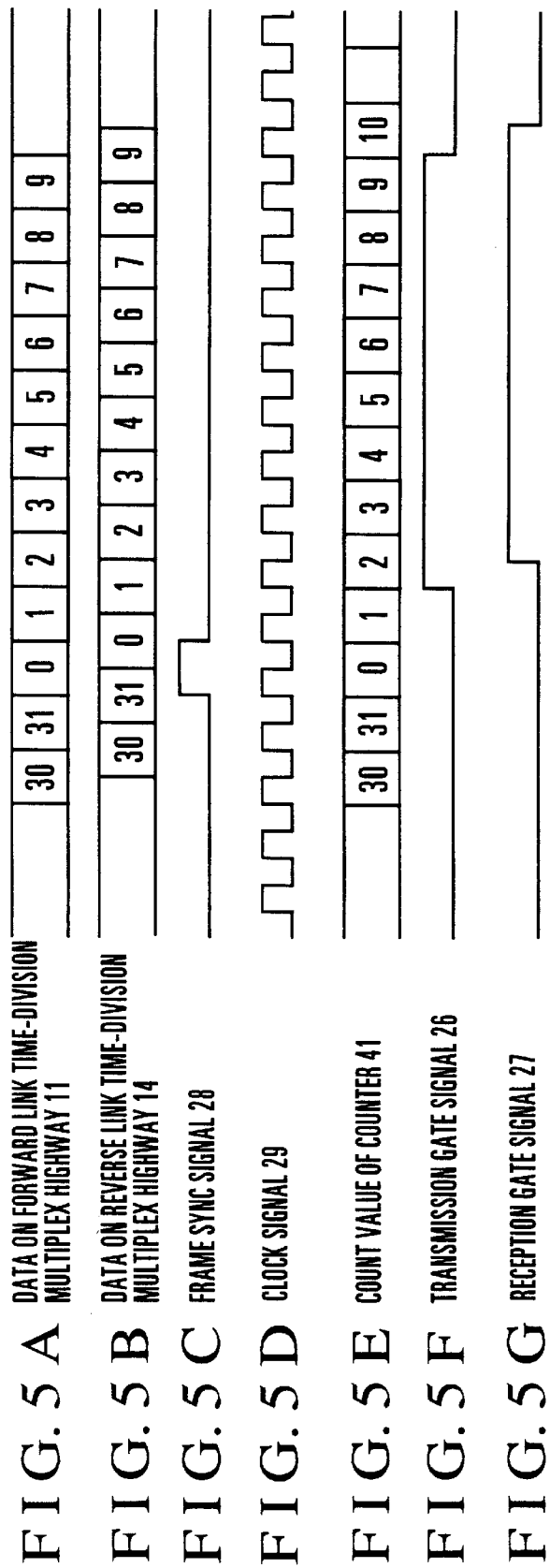
FIGS. 5A to 5G are timing charts showing the waveforms of signals in the respective portions of the ATM interface apparatus in FIG. 1 after the end time slot number is changed.
Figure 7:
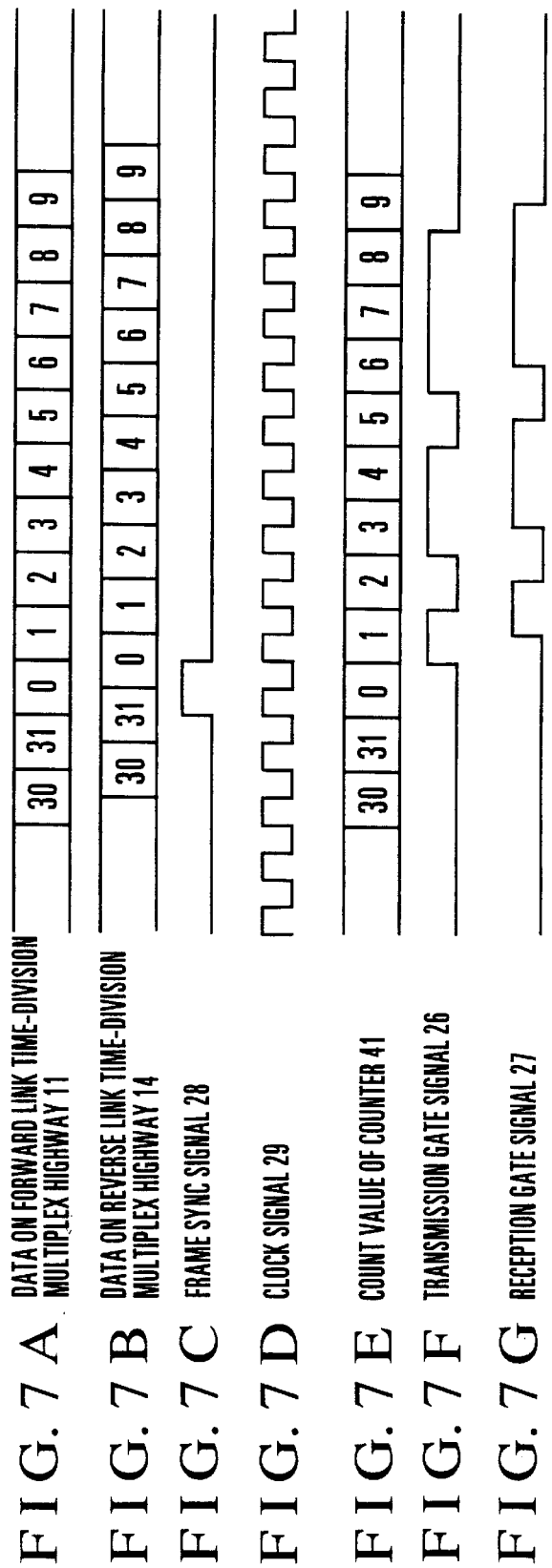
FIGS. 7A to 7G are timing charts showing the waveforms of signals in the respective portions of the ATM interface apparatus having the FIFO control circuit in FIG. 6.

The data in the second to seventh time slots of the forward link time-division multiplex highway 11, which have been changed into parallel data by the serial-to-parallel conversion circuit 15, are written in the transmission FIFO memory 16 in FIG. 1 while the transmission gate signal 26 in FIG. 4F is kept at "H" state. The data stored in the transmission FIFO memory 16 are sequentially sent to the forward link ATM line 12 by the transmission cell synchronous circuit 17 and the frame generation circuit 18 in FIG. 1. The cells received through the reverse link ATM line 13 and stored in the reception FIFO memory 23 are read out while the reception gate signal 27 in FIG. 4G is kept at "H" level, and converted into serial data by the parallel-to-serial conversion circuit 24. Thereafter, the serial data are sent as data for the reverse link time-division multiplex highway 14 in the interval between the second time slot and the seventh time slot. As a result, ATM cells with a band of 768 kbps can be transmitted through the time-division multiplex highways 11 and 14.

An operation to be performed when the traffic changes, and a band of 1,024 kbps is required to transmit ATM cells will be described next.

A change in traffic is detected by the central control unit 54 in FIG. 3. For example, the central control unit 54 recognizes changes in the traffics of the ATM lines 12 and 13 on the basis of band change requests from the terminals connected to the ATM lines 12 and 13 or the received states of cells which have actually arrived at the ATM interface apparatuses 52 and 53. In this case, eight channels are ensured to ensure a band of 1,024 kbps. In order to allocate the second to ninth channels, the central control unit 54 sends a control signal for changing the end time slot number to "10" to the ATM interface apparatuses 52 and 53 and the time-division switch 51. In response to this signal, the value in the second register 43 in each of the ATM interface apparatuses 52 and 53 is rewritten from "8" to "10".

FIGS. 5A to 5G show the states of signals in the respective portions of each of the ATM interface apparatuses 52 and 53 after the end time slot number is changed. The data (FIG. 5A) in the forward link time-division multiplex highway 11, the data (FIG. 5B) in the reverse link time-division multiplex highway 14, the frame sync signal 28 (FIG. 5C), the clock signal 29 (FIG. 5D), and the count value (FIG. 5E) of the counter 41 are identical to those shown in FIGS. 4A to 4G, respectively, and hence a description thereof will be omitted. Since the value in the first register 42 of the FIFO control circuit 25, in which the start time slot number is stored, remains "2", the first coincidence detection circuit 44 outputs the coincidence signal 46 at the timing at which the second time slot of the forward link time-division multiplex highway 11 starts.

Since the value in the second register 43, in which the end time slot number is stored, is changed to "10", the second coincidence detection circuit 45 outputs the coincidence signal 47 at the timing at which the 10th time slot of the forward link time-division multiplex highway 11 starts. With this operation, the first flip-flop circuit 48 keeps the transmission gate signal 26 (FIG. 5F) at "H" level in the interval between the start time of the second time slot of the forward link time-division multiplex highway 11 and the start time of the 10th time slot, i.e., the instant immediately after the end of the ninth time slot. The second flip-flop circuit 49 keeps outputting the reception gate signal 27 (FIG. 5G) in the interval between the start time of the second time slot of the reverse link time-division multiplex highway 14 and the instant immediately after the end of the ninth time slot because the output from the second flip-flop circuit 49 is delayed with respect to the output from the first flip-flop circuit 48 by ½ the period.

By allocating eight time slots for the transmission of cells in this manner, the ATM cells with a band of 1,024 kbps can be transmitted through the time-division multiplex highways 11 and 14. ATM cells can be efficiently transmitted within the transmission capacities of the time-division multiplex highways 11 and 14 by changing the number of time slots to be allocated in accordance with required bands.

In the first embodiment, consecutive time slots are allocated for the transmission of cells with start and end time slot numbers. In the second embodiment, an arbitrary number of time slots of arbitrary slot numbers can be allocated for the transmission of cells.

FIG. 6 shows the schematic arrangement of a FIFO control circuit 25 in the second embodiment. Since other components in the second embodiment are the same as those in the first embodiment, a description thereof will be omitted. The same reference numerals in FIG. 6 denote the same parts as those of the FIFO control circuit 25 shown in FIG. 2, and a description thereof will be omitted. Time slot numbers are respectively stored in first to nth registers $61_1$ to $61_n$. First to nth coincidence detection circuits $62_1$ to $62_n$ detect coincidence between the time slot numbers held in the registers $61_1$ to $61_n$, and the count value of a counter 41. The first to nth coincidence detection circuits $62_1$ to $62_n$ respectively output coincidence signals $63_1$ to $63_n$ while they keep detecting coincidence.

The coincidence signals $63_1$ to $63_n$ output from the coincidence detection circuits $62_1$ to $62_n$ are input to an OR circuit 64. An output signal from the OR circuit 64 is input as a transmission gate signal 26 to a transmission FIFO memory 16 in FIG. 1. The transmission gate signal 26 serves to control the write timing for the transmission FIFO memory 16. The output signal from the OR circuit 64 is input to a second flip-flop circuit 49. The second flip-flop circuit 49 outputs a signal obtained by delaying the output from the OR circuit 64 by a time period corresponding to ½ one time slot. An output signal from the second flip-flop circuit 49 is input as a reception gate signal 27 to a reception FIFO memory 23 in FIG. 1.

In the interval of each time slot, the counter 41 outputs a count value corresponding to each time slot number. Each of the coincidence detection circuits $62_1$ to $62_n$ therefore keeps outputting a corresponding one of the coincidence signals $63_1$ to $63_n$ in the interval between the start time and end time of a time slot corresponding to the slot number held in a corresponding one of the registers $61_1$ to $61_n$. In this case, since each of the coincidence signals $63_1$ to $63_n$ is set at "H" level, an output from the OR circuit 64 is kept at "H" level while each of the coincidence signals $63_1$ to $63_n$ is output.

FIGS. 7A to 7G show the states of signals in the respective portions of an ATM interface apparatus having the FIFO control circuit 25 in FIG. 6. The data (FIG. 7A) in a forward link time-division multiplex highway 11, the data (FIG. 7B) in a reverse link time-division multiplex highway 14, a frame sync signal 28 (FIG. 7C), a clock signal 29 (FIG. 7D), and the count value (FIG. 7E) of the counter 41 are identical to those shown in FIGS. 5A to 5G, and hence a description thereof will be omitted. In the case shown in FIGS. 7A to 7G, the number of registers $61_1$ to $61_n$ is six (n=6), and "1", "3", "4", "6", "7", and "8" are respectively set as time slot numbers in these registers.

The coincidence detection circuits $62_1$ to $62_n$ output coincidence signals $63_1$ to $63_n$ in the intervals of time slots corresponding to these values. The transmission gate signal 26 (FIG. 7F) output from the OR circuit 64 is kept at "H" level in the intervals of time slot "1", time slots "3" and "4", and time slots "6" to "9" of the forward link time-division multiplex highway 11. The reception gate signal 27 (FIG. 7C) output from the second flip-flop circuit 49 is kept at "H" level in the intervals of these time slots of the reverse link time-division multiplex highway 14.

An ATM interface apparatus of the third embodiment can transmit data in a plurality of virtual channels of an ATM line through a time-division multiplex highway. The ATM line can set a plurality of virtual channels physically in the same communication path.

Figure 8:
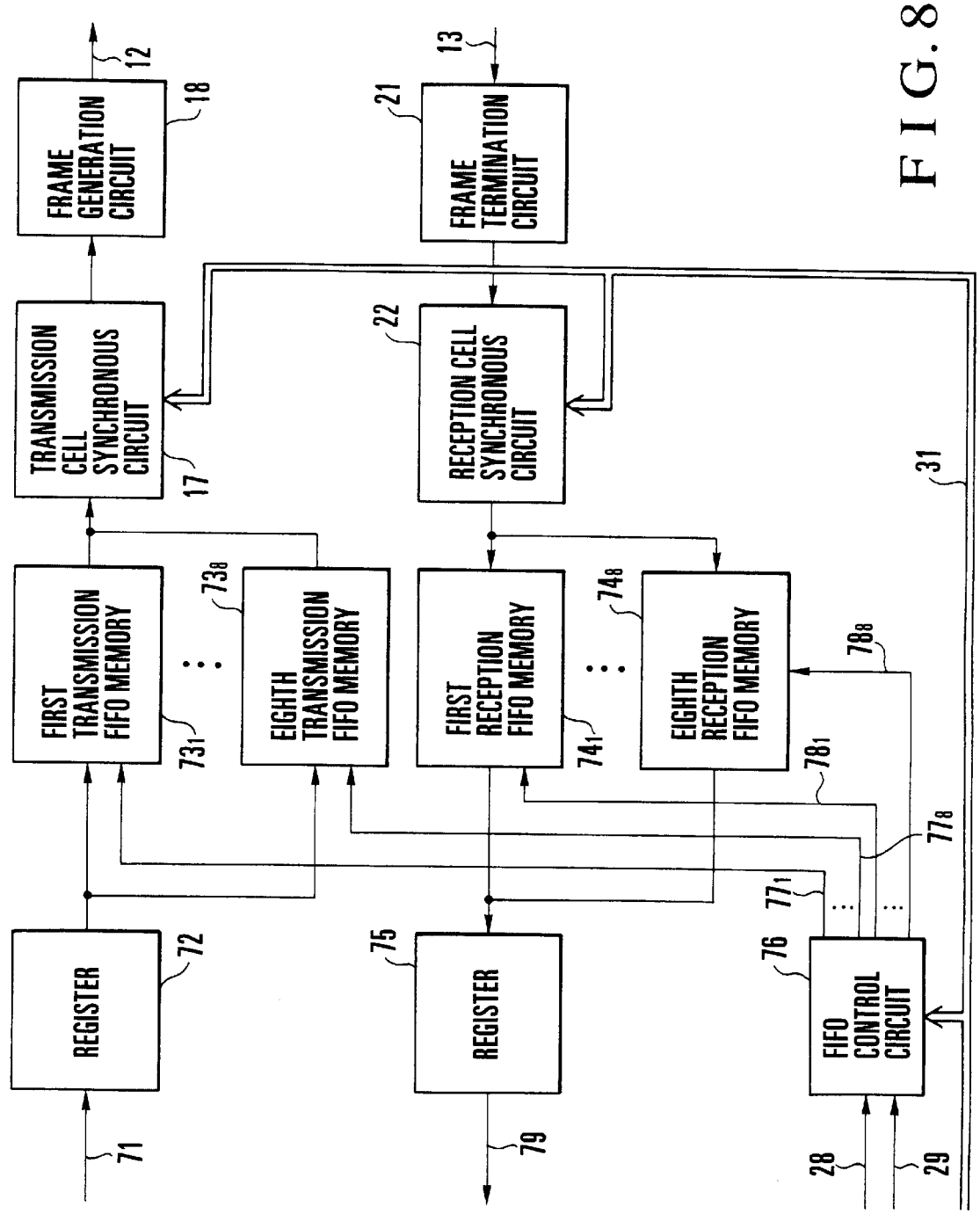
FIG. 8 is a block diagram showing an ATM interface apparatus for time-division multiplex highways according to the third embodiment of the present invention.

FIG. 8 shows the schematic arrangement of an ATM interface apparatus which can cope with a plurality of virtual channels. The same reference numerals in FIG. 8 denote the same parts as those of the ATM interface apparatus shown in FIG. 1, and a description thereof will be omitted. In this case, time-division multiplex highways 11 and 14 transmit signals in a parallel form. For this reason, the serial-to-parallel conversion circuit 15 and the parallel-to-serial conversion circuit 24 shown in FIG. 1 are omitted from this apparatus. In each of time-division multiplex highways 71 and 79, one channel (time slot) has a band of 64 kbps, and 768 channels are time-divisionally multiplexed. Each time-division multiplex highway therefore has a band of 64 kbps=768 ch, i.e., 49.152 Mbps.

Parallel data is input to a register 72 through the forward link time-division multiplex highway 71. The register 72 holds the data as parallel data. An output from the register 72 is input to first to eighth transmission FIFO memories $73_1$ to $73_8$. This apparatus uses the eight transmission FIFO memories $73_1$ to $73_8$ to cope with eight virtual channels. The transmission FIFO memories $73_1$ to $73_8$ for storing data held in the register 72 are selectively switched. Outputs from the transmission FIFO memories $73_1$ to $73_8$ are input to a transmission cell synchronous circuit 17. The transmission cell synchronous circuit 17 cyclically selects one of these eight transmission FIFO memories $73_1$ to $73_8$ in which data are stored, and reads out data from the selected memory. Note that the transmission FIFO memories $73_1$ to $73_8$ may be selected on the basis of the priorities or the like of virtual channels.

First to eighth reception FIFO memories $74_1$ to $74_8$ are connected to a reception cell synchronous circuit 22. Cells output from the reception cell synchronous circuit 22 are stored in the reception FIFO memories $74_1$ to $74_8$ corresponding to the respective virtual channels. The output terminals of the reception FIFO memories $74_1$ to $74_8$ are connected to a register 75 for holding data as parallel data. Data are selectively read out from the reception FIFO memories $74_1$ to $74_8$, and the readout values are held in the register 75. Outputs from the register 75 are sequentially sent to the reverse link time-division multiplex highway 79.

A FIFO control circuit 76 outputs first to eighth transmission gate signals $77_1$ to $77_8$ to the transmission FIFO memories $73_1$ to $73_8$; and first to eighth reception gate signals $78_1$ to $78_8$ to the first to eighth reception FIFO memories $74_1$ to $74_8$. In this manner, the transmission FIFO memories $73_1$ to $73_8$ and the reception FIFO memories $78_1$ to $78_8$ are prepared for the respective virtual channels to interface between ATM lines 12 and 13, each having a plurality of virtual channels, and the time-division multiplex highways 71 and 79.

Figure 9:
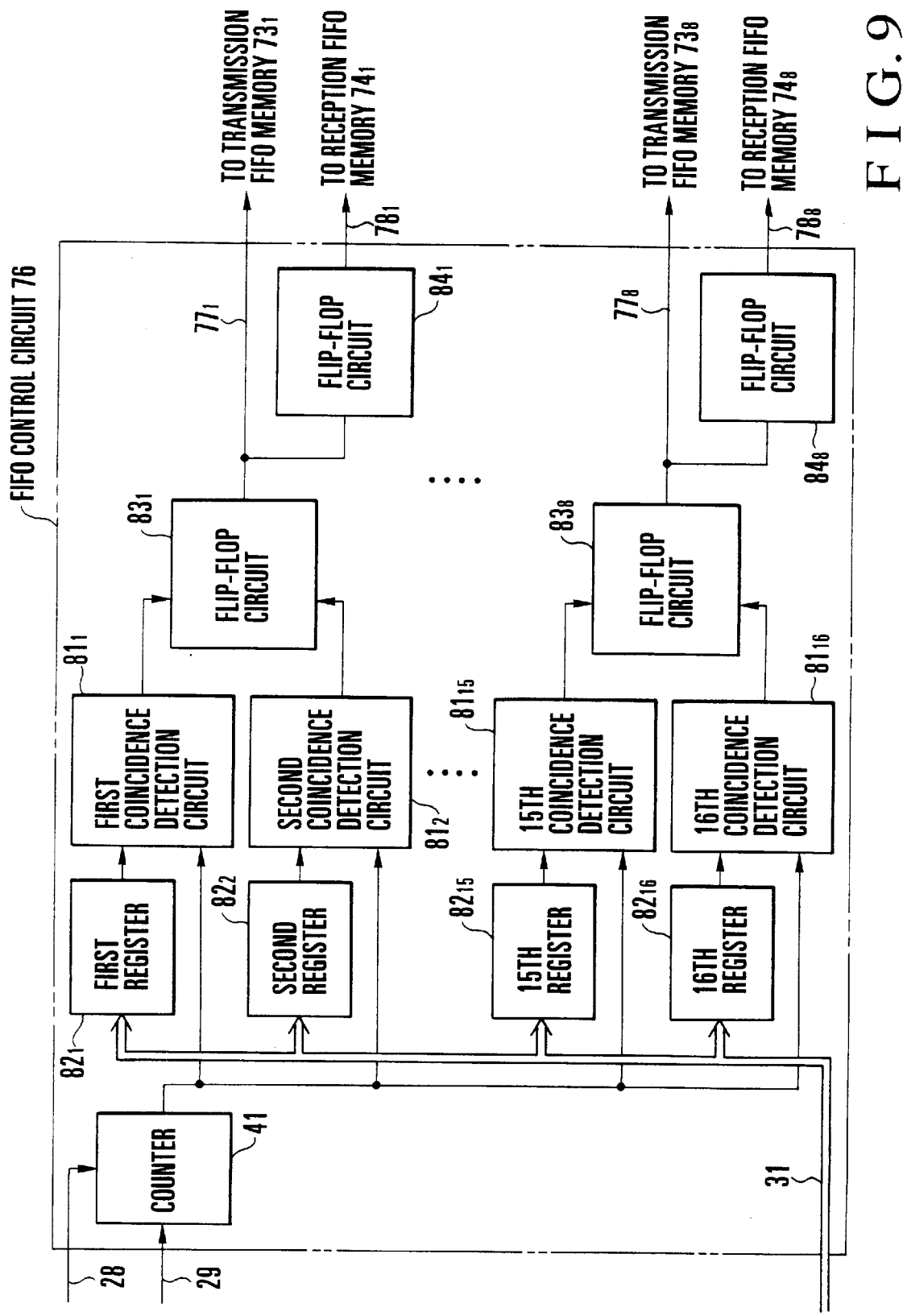
FIG. 9 is a block diagram showing a FIFO control circuit in FIG. 8.

FIG. 9 shows the schematic arrangement of the FIFO control circuit 76 in FIG. 8. The same reference numerals in FIG. 9 denote the same parts as in FIG. 2. A frame sync signal 28 and a clock signal 29 are input to a counter 41. The counter 41 counts time slot numbers in accordance with the timing of each time slot of the forward link time-division multiplex highway 71. A count value output from the counter 41 is input to each of first to 16th coincidence detection circuits $81_1$ to $81_{16}$.

An input/output bus 31 is connected to first to 16th registers $82_1$ to $82_{16}$ for storing the slot numbers of time slots used to transmit cells. The time slot numbers are set in the respective registers $82_1$ to $82_{16}$ through the input/output bus 31. Output values from the registers $82_1$ to $82_{16}$ are input to the corresponding coincidence detection circuits $81_1$ to $81_{16}$. Each of the coincidence detection circuits $81_1$ to $81_{16}$ outputs a high-level coincidence signal when the time slot number set in a corresponding one of the registers $82_1$ to $82_{16}$ coincides with a count value output from the counter 41.

A coincidence signal output from the first coincidence detection circuit $81_1$ is input as a reset signal to a flip-flop circuit $83_1$. A coincidence signal output from the second coincidence detection circuit $82_2$ is input as a reset signal to the flip-flop circuit $83_1$. An output from the third coincidence detection circuit $81_3$ and an output from the fourth coincidence detection circuit $81_4$ are respectively input as set and reset signals to a flip-flop circuit $83_2$. Similarly, outputs from the odd-numbered coincidence detection circuits $81_5$, $81_7$, $81_9$, $81_{11}$, $81_{13}$, and $81_{15}$ are input as set signals to flip-flop circuits $83_3$ to $83_8$, whereas outputs from the even-numbered coincidence detection circuits $81_6$, $81_8$, $81_{10}$, $81_{12}$, $81_{14}$, and $81_{16}$ are input as reset signals to the flip-flop circuits $83_3$ to $83_8$. Outputs from the flip-flop circuits $83_1$ to $83_8$ are input as the first to eighth transmission gate signals $77_1$ to $77_8$ to the transmission FIFO memories $73_1$ to $73_8$.

Output signals from the flip-flop circuits $83_1$ to $83_8$ are input to flip-flop circuits $84_1$ to $84_8$. Each input signal is then delayed by a time period corresponding to ½ a time slot. Output signals from the flip-flop circuits $84_1$ to $84_8$ are input as the first to eight gate signals $78_1$ to $78_8$ to the corresponding reception FIFO memories $74_1$ to $74_8$. As described above, the FIFO control circuit 76 has eight circuits for generating the transmission gate signals $77_1$ to $77_8$ and the reception gate signals $78_1$ to $78_8$. Assume that the first virtual channel data is transmitted in the 12th to 17th time slots, and the second virtual channel data is transmitted in the 181st to 383rd time slots. In this case, time slot number "12" is set in the first register $82_1$ in advance through the input/output bus 31; time slot number "18", in the second register $82_2$; "181", in the third register $82_3$; and "384", in the fourth register $82_4$.

FIGS. 10A to 10F show the states of signals in the respective portions of an ATM interface apparatus having the FIFO control circuit 76 in FIG. 9. The data (FIG. 10A) in the forward link time-division multiplex highway 71 has 768 time slots. The numbers in FIG. 10A represent time slot numbers. Since time slot number "12" is set in the first register $82_1$, the flip-flop circuit $83_1$ is set at the start time of the 12th time slot of the forward link time-division multiplex highway 71. Since time slot number "18" is set in the second register $82_2$, the flip-flop circuit $83_1$ is reset immediately after the 17th time slot ends.

The first transmission gate signal $77_1$ (FIG. 10B) output from the flip-flop circuit $83_1$ is therefore kept at "H" level in the interval between the start time of the 12th time slot and the end time of the 17th time slot. The first reception gate signal $78_1$ (FIG. 10C) is delayed by a time period corresponding to ½ a time slot with respect to the first transmission gate signal $77_1$. For this reason, the first reception gate signal $78_1$ is kept at "H" level in the interval between the start time of the 12th time slot of the reverse link time-division multiplex highway 79 and the instant immediately after the end of the 17th time slot. Since "181" is set in the third register $82_3$, the flip-flop circuit $83_2$ is set at the start time of the 181st time slot of the forward link time-division multiplex highway 71. Since "384" is set in the fourth register $82_4$, the flip-flop circuit $83_2$ is reset immediately after the end of the 383rd time slot.

With this operation, the second transmission gate signal $77_2$ (FIG. 10D) is kept at "H" level in the interval between the start time of the 181st time slot of the forward link time-division multiplex highway 71 and the instant immediately after the end of the 383rd time slot. The second reception gate signal $78_2$ (FIG. 10E) is kept at "H" level in the interval between the start point of the 181st time slot of the reverse link time-division multiplex highway 79 and the instant immediately after the end of the 383rd time slot. While the first transmission gate signal $77_1$ is output, data corresponding to the first virtual channel and received through the forward link time-division multiplex highway 71 is input to the first transmission FIFO memory $73_1$ in FIG. 8 to be stored therein. While the second transmission gate signal $77_2$ is output, received data corresponding to the second virtual channel is sequentially stored in the second transmission FIFO memory $73_2$. In this manner, data received through the forward link time-division multiplex highway 71 can be distributed and stored in the different transmission FIFO memories $73_1$ to $73_8$ in correspondence with the respective virtual channels.

While the first reception gate signal $78_1$ is output, data is read out from the first reception FIFO memory $74_1$ and sent to the reverse link time-division multiplex highway 79. While the second reception gate signal $78_2$ is output, data is read out from the second reception FIFO memory $74_2$ and sent to the reverse link time-division multiplex highway 79. Since the cell data are stored in the respective reception FIFO memories $74_1$ to $74_8$ by the reception cell synchronous circuit 22 in correspondence with the respective virtual channels, the first virtual channel data can be transmitted to the 12th to 17th time slots of the reverse link time-division multiplex highway 79. The second virtual channel data can also be sent to the 181st to 383rd time slots.

As described above, the transmission FIFO memories $73_1$ to $73_8$ and the reception FIFO memories $74_1$ to $74_8$ are arranged for the respective virtual channels, and the gate signals $77_1$ to $77_8$ and $78_1$ to $78_8$ are respectively sent to the corresponding FIFO memories, thereby allowing the use of the time slots of the time-division multiplex highways 71 and 79 for the respective virtual channels. In addition, cells can be transmitted/received between the ATM lines 12 and 13 in accordance with the priories of the respective virtual channels.

In each embodiment described above, although a detailed description of the transmission cell synchronous circuit 17, the reception cell synchronous circuit 22, the frame generation circuit 18, and the frame termination circuit 21, which are used to transmit and receive ATM cells, is omitted, conventional circuits can be used as these circuits. A description of a physical interface for ATM transmission paths is also omitted for the same reason. Signals for time-division multiplex highways may take a serial or parallel form. If the serial form is selected, a parallel-serial conversion circuit and a serial-parallel conversion circuit are required. If the parallel form is selected, such circuits are not required.

The band of each time-division multiplex highway is not limited to the one in the embodiments. In this third embodiment, eight virtual channels are assumed. However, the number of virtual channels can be arbitrarily set as long as enough transmission and reception FIFO memories are prepared for the virtual channels, and gate signals are independently supplied thereto.

In each embodiment described above, the phase difference between the reverse link time-division multiplex highway and the forward link time-division multiplex highway is ½ a period. However, an arbitrarily timing difference may be set between these highways. For example, if the timings of transmission and reception gate signals generated on the basis of a frame sync signal and a clock signal on the forward link time-division multiplex highway are adjusted by flip-flop circuits on the basis of a clock signal on the reverse link time-division multiplex highway, gate signals corresponding to the reverse link time-division multiplex highway can be generated regardless of a phase difference.

In each embodiment described above, the FIFO control circuit 25 is commonly used in the reverse and forward link directions. However, FIFO control circuits, from each of which the second flip-flop circuit 49 is omitted, may be arranged in the reverse and forward link directions. In this arrangement, the forward link FIFO control circuit outputs a transmission gate signal whose timing is controlled through the forward link time-division multiplex highway, and the reverse link FIFO control circuit outputs a reception gate signal whose timing is controlled through the reverse link time-division multiplex highway regardless of the transmission gate signal. That is, ATM interface operations may be performed independently in the reverse and forward link directions.

As has been described above, according to the present invention, since cells can be transmitted by using designated time slots, the line utilization efficiency of a time-division multiplex highway can be improved by, for example, changing the number of time slots designed in accordance with the traffic of cells.

In addition, numbers corresponding to the start and end positions of an arbitrary number of consecutive time slots which are designed to transmit cells are held, and cells are transmitted and received by using the time slots between the start and end positions. As described above, it suffices if only the start and end positions are held, and only coincidence between the positions and corresponding values is detected. Therefore, the arrangement of the apparatus can be simplified.

Since different time slots and different cell buffers are used for the respective virtual channels of ATM lines, data in a plurality of virtual channels can be transmitted through the time-division multiplex highways.

The timing of each time slot and coincidence between a corresponding number and each time slot number are detected on one time-division multiplex highway, while such data corresponding to the other time-division multiplex highway is generated on the basis of the phase difference between the reverse link and forward link time-division multiplex highways. With this operation, the arrangement of the apparatus can be greatly simplified.

Furthermore, since time slots are designed in number corresponding to the traffic of cells, each time-division multiplex highway can be efficiently used in accordance with a traffic.

Moreover, since first-in first-out memories are used as cell buffers, a read order and addresses need not be managed. The arrangement of the apparatus can therefore be simplified.

What is claimed is:

1. An ATM interface apparatus for a time-division multiplex highway, comprising:

holding means for holding allocation information of a time slot used to transmit a cell as a transmission unit in asynchronous transfer mode (ATM) communication through a time-division multiplex highway;

detection means for detecting a timing and number of each time slot of the time-division multiplex highway;

a cell buffer for storing cells transmitted through an ATM communication line and exchanging the cells between the ATM communication line and the time-division multiplex highway;

determination means for determining, on the basis of the time slot number detected by said detection means and the allocation information held in said holding means, whether a time slot is used for transmission of a cell; and control means for, when a determination result obtained by said determination means indicates that the time slot is used for transmission of the cell, controlling transfer of the cell between the ATM communication line and the time-division multiplex highway by designating cell read/write access to said cell buffer, wherein said holding means holds start and end time slot numbers designating an allocation range of time slots to be consecutively used to transmit cells, said determination means determines whether a time slot number detected by said detection means falls within the allocation range held by said holding means, and said control means designates cell read/write access to said cell buffer if the time slot number falls within the allocation range, and wherein said detection means comprises a counter which is reset by a frame sync signal and counts time slots, said holding means comprises first and second registers for respectively holding start and end time slot numbers, said determination means comprises first and second coincidence detection circuits for detecting coincidence between a count value of said counter and contents of said first and second registers, and said control means comprises a flip-flop circuit which is set by a coincidence output from said first coincidence detection circuit, and reset by a coincidence output from said second coincidence detection circuit, said flip-flop circuit outputting a set output as a gate signal to said cell buffer.

2. An apparatus according to claim 1, wherein said flip-flop circuit comprises a delay circuit for delaying an output from said flip-flop circuit by a predetermined phase, and outputs from said flip-flop circuit and said delay circuit are output as transmission and reception gate signals to said cell buffer.

3. An apparatus according to claim 1, wherein said cell buffer comprises a first-in first-out memory from which data is read out in a write order.

4. An ATM interface apparatus for a time-division multiplex highway, comprising:

holding means for holding allocation information of a time slot used to transmit a cell as a transmission unit in asynchronous transfer mode (ATM) communication through a time-division multiplex highway;

detection means for detecting a timing and number of each time slot of the time-division multiplex highway;

a cell buffer for storing cells transmitted through an ATM communication line and exchanging the cells between the ATM communication line and the time-division multiplex highway;

determination means for determining, on the basis of the time slot number detected by said detection means and the allocation information held in said holding means, whether a time slot is used for transmission of a cell; and control means for, when a determination result obtained by said determination means indicates that the time slot is used for transmission of the cell, controlling transfer of the cell between the ATM communication line and the time-division multiplex highway by designating cell read/write access to said cell buffer, wherein said time-division multiplex highway comprises a reverse link time-division multiplex highway and a forward link time-division multiplex highway having a predetermined phase difference with respect to the reverse link time-division multiplex highway, the ATM communication line comprises a reverse link ATM line and a forward link ATM line, said cell buffer comprises a transmission cell buffer for temporarily storing cells received through the forward link time-division multiplex highway and outputting the cells to the forward link ATM line, and a reception cell buffer for temporarily storing cells received through the reverse link ATM line and outputting the cells to the reverse link time-division multiplex highway, and said control means designates cell read/write access to one of said transmission and reception cell buffers, and also designates cell read/write access to the other of said transmission and reception cell buffers with a predetermined phase difference, when a determination result obtained by said determination means indicates that a time slot is used for transmission of cells.

5. An apparatus according to claim 4, further comprising transmission cell synchronous means for establishing cell synchronization for an output from said transmission buffer, frame generation means for converting cell data output from said transmission cell synchronous means into data in a predetermined frame format, and transmitting the data to the forward link ATM line, frame termination means for terminating the reverse link ATM line and extracting cells therefrom, and reception cell synchronous means for establishing cell synchronization for an output from said frame termination means and outputting the output to said reception cell buffer.

6. An ATM interface apparatus for a time-division multiplex highway, comprising:

time slot number holding means for, every time an arbitrary number of time slots used for transmission of cells as transmission units in asynchronous transfer mode (ATM) communication through reverse link and forward link time-division multiplex highways are designated, holding slot numbers of the time slots;

reverse link time slot number detection means for sequentially detecting timings and numbers of the respective time slots of the reverse link time-division multiplex highway;

forward link time slot number detection means for sequentially detecting timings and numbers of the respective time slots of the forward link time-division multiplex highway;

a reception cell buffer for storing cells received through an ATM communication line;

a transmission cell buffer for storing cells to be output to the ATM communication line;

reverse link time slot number coincidence detection means for detecting whether a time slot number detected by said reverse link time slot number detection means coincides with any one of the numbers held by said time slot number holding means;

buffer read means for reading out cells from said reception cell buffer and outputting the cells to the reverse link time-division multiplex highway when said reverse link time slot number coincidence detection means detects coincidence between the time slot numbers;

forward link time slot number coincidence detection means for detecting whether a time slot number detected by said forward link time slot number detection means coincides with any one of the numbers held by said time slot number holding means; and buffer write means for extracting transmitted data from said forward link time-division multiplex highway and writing the data in said transmission cell buffer when said forward link time slot number coincidence detection means detects coincidence between the time slot numbers.

* * * * *